United States Patent [19]

Sager et al.

[11] Patent Number: 5,784,567

[45] Date of Patent: Jul. 21, 1998

[54] SYSTEM AND METHOD FOR COORDINATING COMMUNICATION BETWEEN LAYERS OF A LAYERED COMMUNICATION SYSTEM

[75] Inventors: Gary R. Sager, Los Altos; Thomas H. Speeter, San Ramon, both of Calif.

[73] Assignee: Silicon Graphics, Inc., Mountain View, Calif.

[21] Appl. No.: 571,366

[22] Filed: Dec. 13, 1995

[51] Int. Cl.⁶ .................. G06F 13/00; H04J 3/00
[52] U.S. Cl. .................. 395/200.61; 395/200.6; 370/469
[58] Field of Search ............. 395/200.8, 680, 395/681, 200.6, 200.61, 200.62; 370/469

[56] References Cited

U.S. PATENT DOCUMENTS

| | | | |
|---|---|---|---|
| 5,187,708 | 2/1993 | Nakatani et al. | 370/469 |
| 5,245,608 | 9/1993 | Deaton, Jr. et al. | 370/469 |
| 5,278,834 | 1/1994 | Mazzola | 370/469 |
| 5,408,661 | 4/1995 | Kuranaga | 395/821 |

*Primary Examiner*—Parshotam S. Lall
*Assistant Examiner*—Viet Vu
*Attorney, Agent, or Firm*—Sterne, Kessler, Goldstein & Fox P.L.L.C.

[57] ABSTRACT

A system and method for facilitating communication between layers in a multi-layer system. Opaque information is utilized to pass information between layers in an indirect communication. A single horizontal communication between the highest layer in a first communication end of the system passes opaque information collected from all lower layers to the highest layer in a second communication end. Vertical communications are utilized to distribute the opaque information to the intended layer.

6 Claims, 5 Drawing Sheets

SYSTEM AND METHOD FOR COORDINATING COMMUNICATION BETWEEN LAYERS OF A LAYERED COMMUNICATION SYSTEM

BACKGROUND OF THE INVENTION

1. Field of the Invention

The present invention relates generally to networks, and more specifically is directed toward providing a protocol for improving communications efficiency between complex, layered distributed systems communicating over a network.

2. Related Art

The advent of interactive networks has permitted system designers to develop distributed systems capable of performing a wide range of complex functions. As the range and complexity of these functions has grown, however, so too have the problems associated with the utilization of a network to accommodate all communications required between the distributed systems. This has been particularly true in the on-demand video industry.

For example, in a conventional distributed system used to deliver video on-demand, a client system and a server system exist at opposite ends of an interactive network. Because of the inherent complexity of the functions to be performed within such a system (e.g., ordering a movie, defining and ensuring connectivity, defining and securing required bandwidth, delivering the movie, etc.), these functions are typically organized into multiple layers of functionality with portions of each layer residing on multiple systems. In other words, each of these functions is incorporated in well defined modular structures that permit maximum compatibility with various client and/or server applications.

Generally, communication between such layered systems creates a number of problems. First, as stated above, a significant amount of information is communicated over the network among portions of a given layer in order to provide the requested signal (e.g., a movie). Furthermore, communication in one layer must be coordinated with the communication in the remaining layers (i.e., associated communication over the network among the portions of those other layers).

Conventional systems have utilized complex methods to insure the proper sequence of communication within and between multiple layers. As the number of layers in the system increase, greater demands are placed upon the synchronization method. These added complexities serve as a limiting factor to the benefits gained from the modular aspects of distributed layered systems.

Therefore, what is needed is an improved method for synchronizing the individual communications between multiple layers, while reducing the actual network traffic required.

SUMMARY OF THE INVENTION

The present invention satisfies the above mentioned needs by providing an improved communication method that passes opaque information between multiple layers. This opaque information represents information that is passed vertically between layers without actual knowledge of its contents. Generally, the opaque information has meaning to a single layer but not all layers.

In an n-layer distributed system, where the first communication end is a client system and the second communication end is a server system. The client nth layer calls the client (n-1)th layer to collect information to be communicated to the server (n-1)th layer. Likewise, the client (n-1)th layer calls the client (n-2)th layer. This process is continued until the first layer is called.

At each call, the caller provides information regarding the nature of the high-level function (as initiated by client layer n) to be performed. The client first layer supplies its opaque information to be communicated to the server first layer to the client second layer, along with other information required by the client layers above. At each client layer, actions related to fulfillment of the high-level function can be performed during the "call" or "return" phase of this client communication.

Having accumulated a complete set of opaque data, the client nth layer communicates this information over the network to the server nth layer, along with information regarding the nature of the high-level function to be performed.

The server nth layer calls the server (n-1)th layer to both supply information from the client (n-1)th layer and to collect information to communicate back to the client (n-1)th layer. Likewise, the server (n-1)th layer calls the server (n-2)th layer. This process is continued until the server first layer is called. At each call, the caller provides information regarding the nature of the high-level function (as initiated by layer n) to be performed. The called server layer uses the opaque information passed from its corresponding client layer plus information passed from the server layers above to determine the actions needed to fulfill the high-level function requested.

After each server layer acts upon this information, each server layer appends its possibly modified opaque information to the accumulated opaque information from lower layers and returns it to the server layer above, along with other information required by the server layers above. At each server layer, actions related to fulfillment of the high-level function can be performed during the "call" or "return" phase of this server communication.

Having accumulated a complete set of opaque data, the server nth layer returns this information over the network to the client nth layer, along with information in response to the request initiated by the client nth layer.

The client nth layer then calls the client (n-1)th layer to provide information communicated from the server (n-1)th layer. Likewise, the client (n-1)th layer calls the client (n-2)th layer. This process continues until the client first layer is called. At each call, the caller provides information regarding the nature of the high-level function (as initiated by client layer n) to be performed. The client first layer acts upon its opaque information from the server first layer and returns information required by the client layers above. At each client layer, actions related to fulfillment of the function can be performed during the "call" or "return" phase of this client communication. Once the (n-1)th layer returns information to the nth layer, the requested function is complete.

By this process, wherein communication is completed in a single round trip, the complex synchronization issues inherent in typical multi-layer communication are eliminated.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

In a preferred embodiment, the present invention is applicable to the communication between layers in a video on-demand system. As will be described in greater detail below, however, the present invention is applicable to the general method of communication between distributed systems having multiple layers.

Generally, a layer is defined in terms of functionality. Functional aspects of the system can be broken down into well defined modular components that allow system designers to selectively build upon existing layers. For example, at a lowest level, a functional layer may be dedicated to the protocol necessary for setting up or controlling communication at the bit level. Higher levels, on the other hand, may be dedicated to the protocols necessary for carrying out user selected activities (e.g., playing a movie). Most of these functional layers are invisible to the user. As a benefit of this method of system design, a subset of the layers in a first system may be utilized as the basis of the design of a second system.

Figure 1:
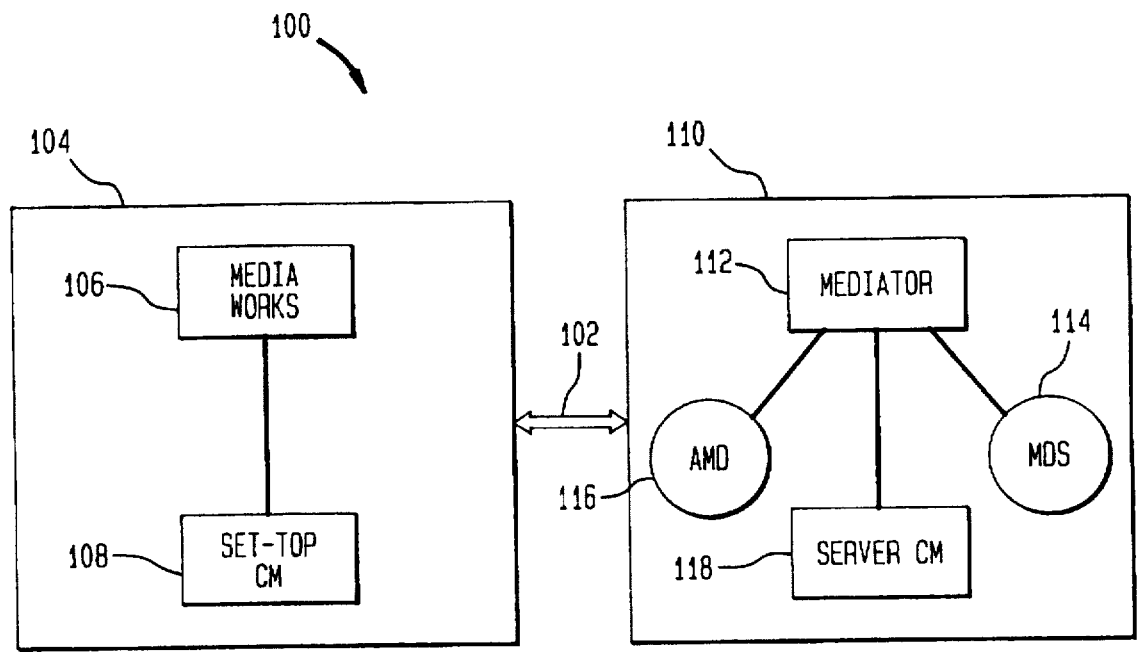
FIG. 1 illustrates an environment in which the present invention is operative.

FIG. 1 illustrates a video on-demand system 100 that comprises first communication end 104 and second communication end 110. First communication end 104 comprises MediaWorks 106 and set-top connection manager (CM) 108. MediaWorks 106 is an application program that allows a user to select a video program. Set-Top CM 108, on the other hand, includes the protocol required in connection with a server. For our purposes here, MediaWorks 106 is labeled as a second layer and Set-Top CM 108 is labeled as a first layer. Both the first and second layers on first communication end 104 communicate with corresponding first and second layers on second communication end 110 through network 102.

In video on-demand environment 100, second communication end 110 comprises Mediator 112 and server CM 118. Mediator 112 is a second layer counterpart to MediaWorks 106. Server CM 118 is a first layer counterpart to set-top CM 108. Asset manager database 116 contains listings of movie parameters such as the required bandwidth. Additionally, asset manager database 116 contains listings of the servers that have a copy of the video (e.g., MPEG data) selected by the user. Media delivery service 114 controls the actual playback of the video. Asset manager database 116 and media delivery service 114 are modules contained in the same layer as the mediator.

Figure 2:
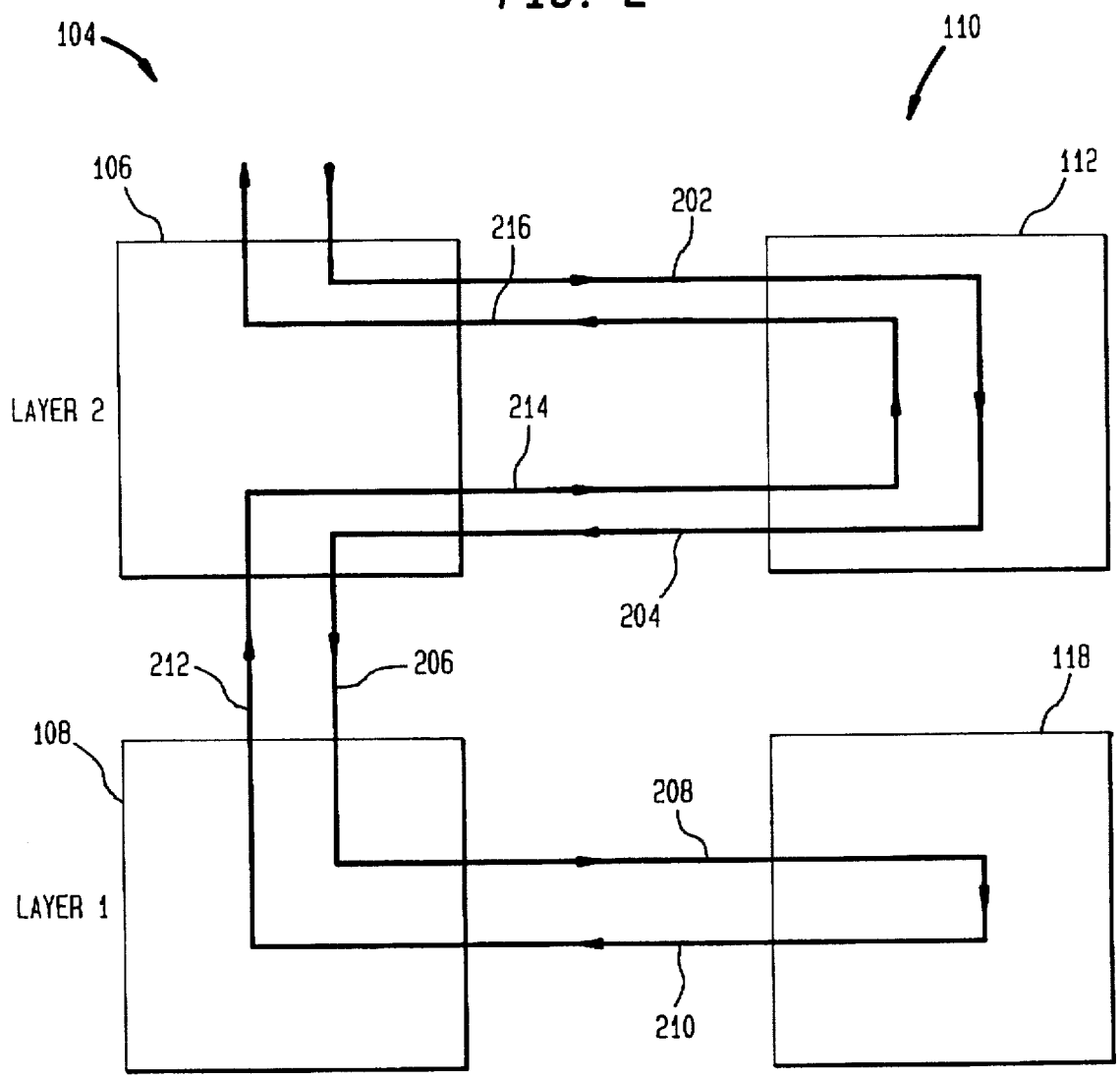
FIG. 2 illustrates a data flow diagram of communication between two functional layers in a conventional method.
Figure 3:
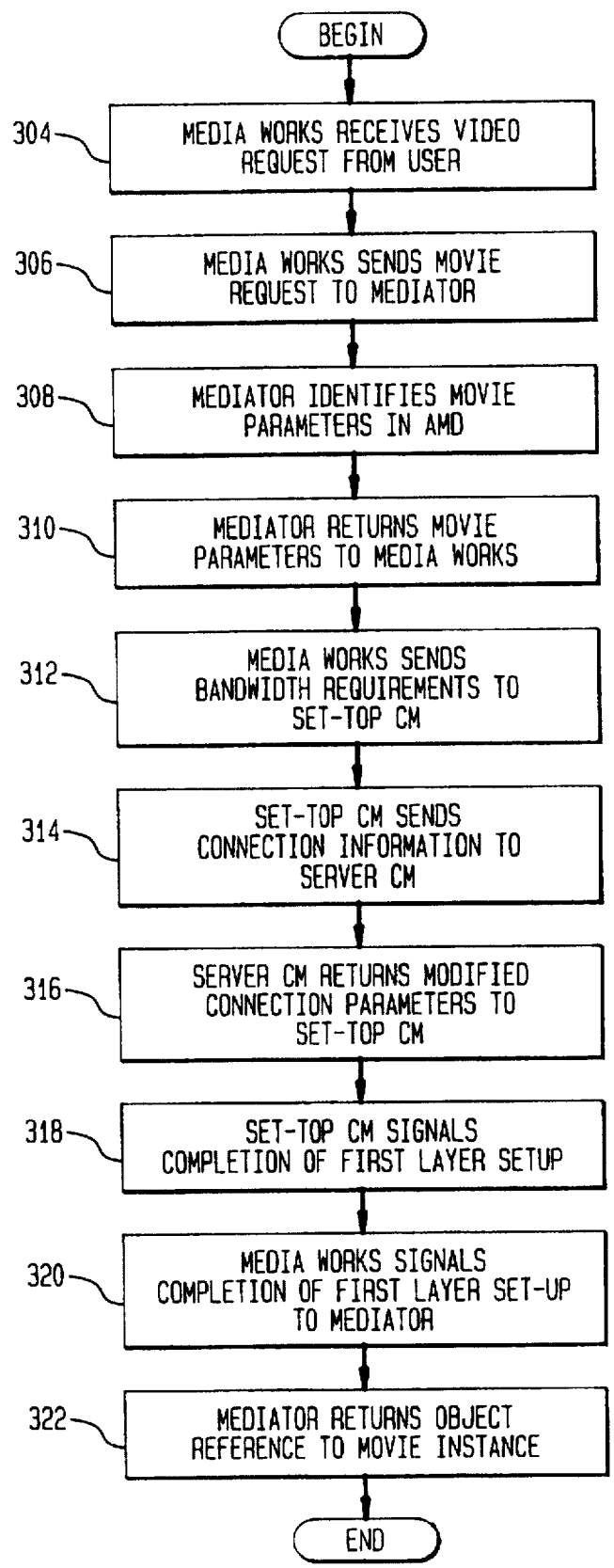
FIG. 3 illustrates a flow chart of communication between two functional layers in a conventional method.

In a conventional system, communication between second layers (i.e., MediaWorks 106 and Mediator 112) and communication between first layers (i.e., set-top CM 108 and server CM 118) occur independently. This process is illustrated with reference to FIGS. 2 and 3. FIG. 2 illustrates a data flow diagram. FIG. 3 illustrates a process flow diagram.

The process begins in step 304 where MediaWorks 106 receives a video request from a user. In step 306, MediaWorks sends the movie request to Mediator 112. This step is illustrated by data flow 202 in FIG. 2. Upon receipt of the movie request, Mediator 112 identifies, in step 308, the appropriate movie parameters that are stored in asset manager database 116. These movie parameters include the bandwidth required by the movie choice and the server that contains a copy of the movie.

In step 310, Mediator 112 returns the movie parameters to MediaWorks 106. This step is illustrated by data flow 204 in FIG. 2. Communication 202 and 204 represent a first two-way horizontal communication between MediaWorks 106 and Mediator 112. In this context, a horizontal communication is defined as a direct communication between corresponding layers on two communication ends.

After the first two-way horizontal communication 202, 204 identifies the availability of the user-selected movie, second layer elements set-top CM 108 and server CM 118 set up the communication path. This communication between the first layers on first communication end 104 and second communication end 110 conventionally follows the completion of the first two-way horizontal communication 202, 204. Specifically, in step 312, MediaWorks 104 sends the appropriate bandwidth requirements to set-top CM 108. This vertical communication (i.e., communication between layers) corresponds to data flow 206. Upon receipt of the bandwidth requirements, set-top CM 108 communicates with server CM 118 to establish a communication path for the movie to be played.

This process begins in step 314 where set-top CM 108 sends connection parameters to server CM 118. This step corresponds to data flow 208. Next, in step 316, server CM 118 returns modified connection parameters (e.g., retuning) to set-top CM 108. This step corresponds to data flow 210. In combination data flows 208 and 210 represent a two-way horizontal communication between the first layers in first communication end 104 and second communication end 110.

After the first layer communication is completed, set-top CM 108 signals the completion to MediaWorks 104 in step 318. This vertical communication is represented by data flow 212. Next, in step 320, MediaWorks 104 signals to Mediator 112 the completion of the second layer set-up in a second horizontal communication between the first layers. This communication is represented by data flow 214. Finally, in step 322, Mediator 112 completes the second horizontal communication between the second layers by returning an object reference to the movie instance. This communication is represented by data flow 216.

As this description of a conventional communication method illustrates, multiple horizontal communications are required (i.e., two in the second layer and one in the first layer). This results from the synchronization problem of communication at multiple layers. Generally, whenever one layer's communication is dependent upon information from any of the other layers, sequential order of completion follows. In the context of the conventional method illustrated in FIG. 2, the communication comprises the following general scheme: (1) initial second layer communication 202, 204, (2) first layer communication 208, 210, and (3) final second layer communication 214, 216. As will be appreciated by one of ordinary skill in the relevant art, this general scheme becomes even more complex and less efficient as the number of layers in the system increases.

The present invention addresses this problem of multi-layer communication by providing a framework for eliminating multiple horizontal communications between layers. Specifically, the present invention allows all of the communication between multiple layers to be conducted in a single two-way horizontal communication. This method is described with reference to FIGS. 4 and 5.

The process begins in step 504 where MediaWorks 106 receives a video request from a user. Instead of immediately sending this request to Mediator 112, MediaWorks 106 queries set-top CM 108 for information that would have been sent to server CM 118. In other words, MediaWorks assumes that Mediator 112 will send the information to the server CM. This query in step 506 corresponds to data flow 402.

Figure 4:
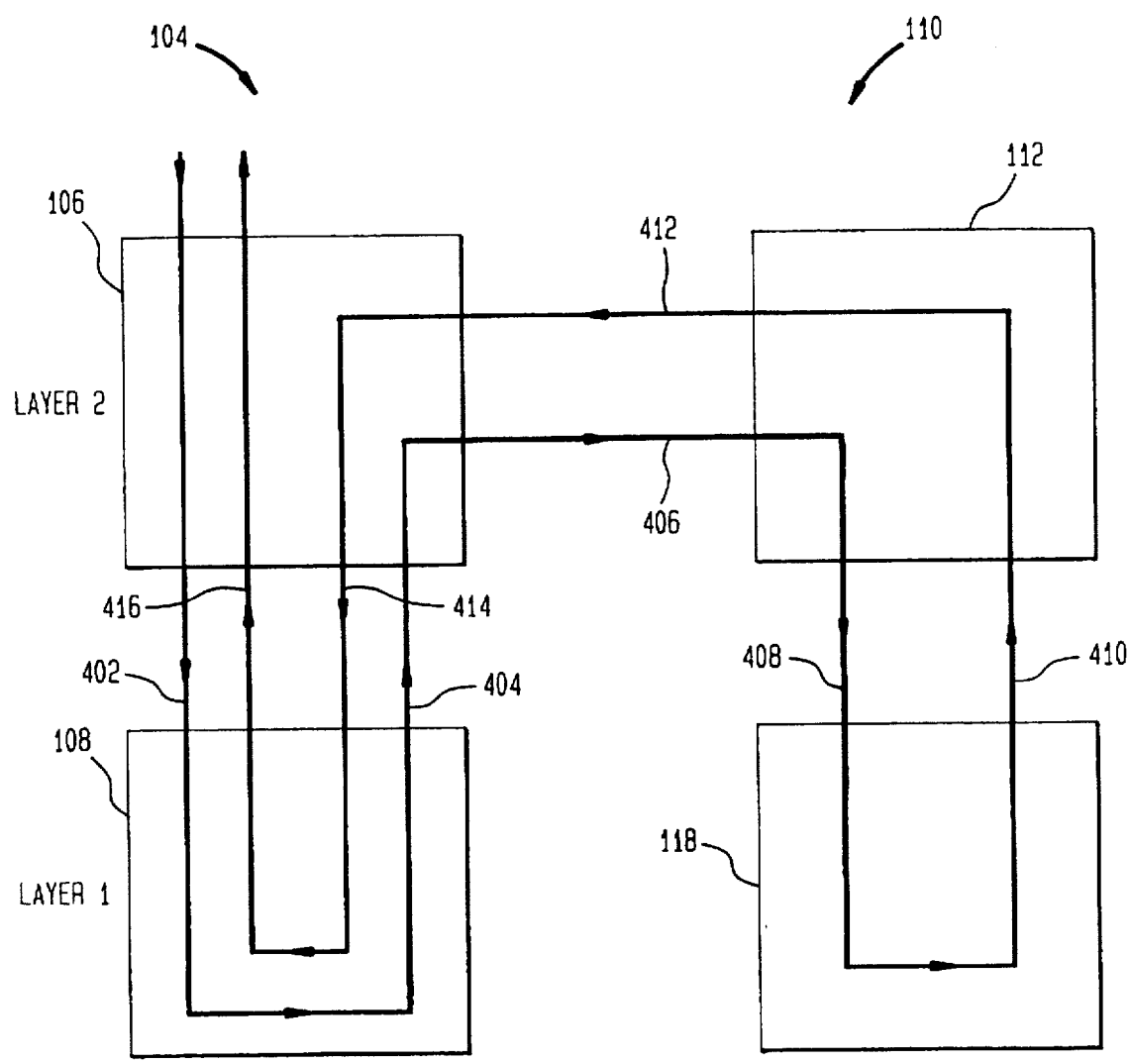
FIG. 4 illustrates a data flow diagram of communication between two functional layers in a preferred embodiment.
Figure 5:
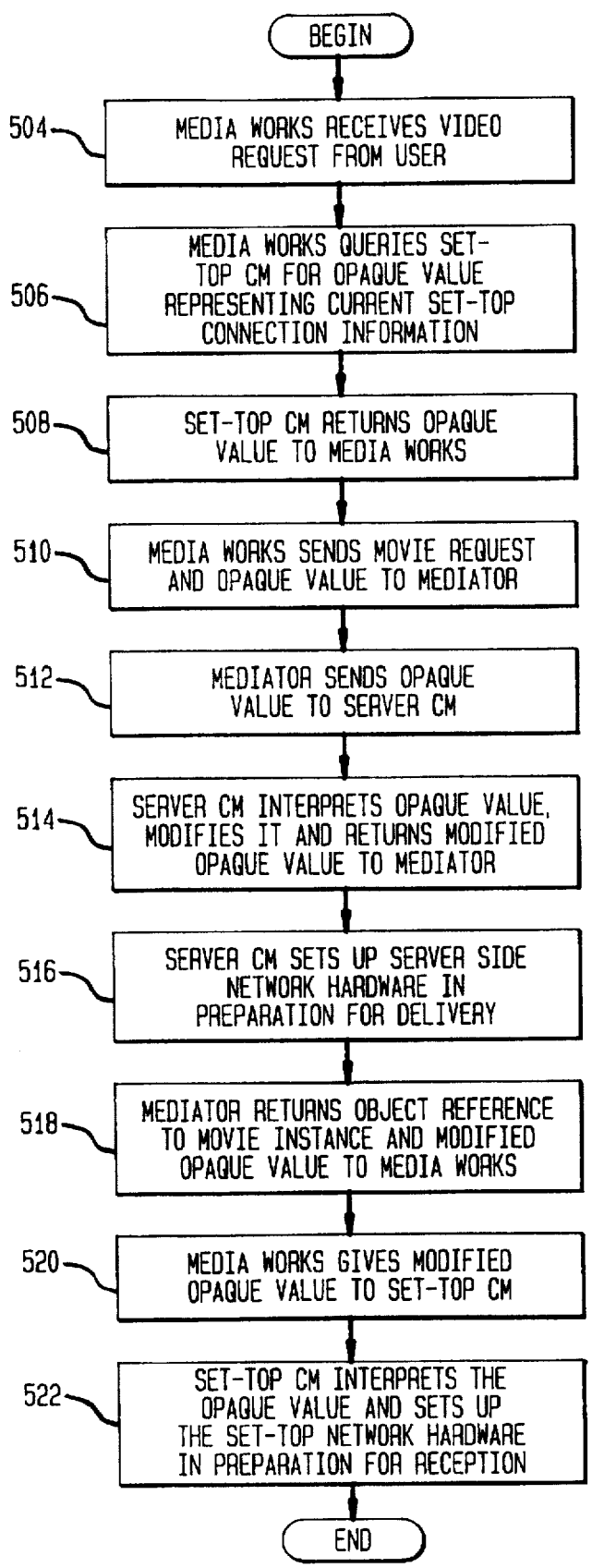
FIG. 5 illustrates a flow chart of communication between two functional layers in a preferred embodiment.

Set-top CM 108 responds, in step 508, with a "cookie" that is returned to MediaWorks 106. This response corresponds to data flow 404. The "cookie" represents opaque information that is passed between layers without actual knowledge of its contents. Generally, the opaque information has meaning to someone but not everyone. In the context of FIG. 4, MediaWorks 106 has no idea what the "cookie" represents. All MediaWorks 106 knows is that it needs the "cookie" to complete the communication with second communication end 110. In comparison to the conventional method of FIG. 2, this "cookie" contains information that would have been sent in an independent horizontal communication 208.

In step 510, MediaWorks 104 sends the movie request and the "cookie" to Mediator 112. This horizontal communication corresponds to data flow 412. In step 512, since Mediator 112 knows that the "cookie" is not intended for second layer communication, Mediator 112 routes the "cookie" to server CM 118. This vertical communication corresponds to data flow 408.

Next, in step 514, server CM 118 interprets the connection information in the "cookie", modifies it as necessary, and returns the modified "cookie" to Mediator 112. This vertical communication corresponds to data flow 410. In step 516, server CM 118 sets up the server-side network hardware in preparation for movie delivery. The "cookie" that is returned to Mediator 112 includes the information that would have been sent to set-top CM 108. This information (e.g., retuning) is analogous to the information contained in horizontal communication 210 in the conventional methods.

After this "cookie" is received by Mediator 112, Mediator 112 completes the single horizontal communication in step 518. Specifically, Mediator 112 returns an object reference to a movie instance and the "cookie" to MediaWorks 104. This horizontal communication corresponds to data flow 412.

Next, in step 520, MediaWorks 104 gives the "cookie" to set-top CM 108 to complete the second layer set-up. This vertical communication corresponds to data flow 414. Finally, in step 522, set-top CM 108 interprets the "cookie" and sets up the set-top network hardware in preparation for movie reception.

As this description illustrates, the improved method of multi-layer communication greatly reduces the synchronization problems that necessitated multiple horizontal communications. Instead, a single horizontal communication 406, 412 is utilized in combination with multiple vertical communications 402, 404, 408, 410, 414, 416 between layers on a single communication end. Significantly, the present invention greatly reduces the reliance on the resources of network 202 and improves the response time for viewer requests. Whereas previously, multiple communications were made over network 202, now only a single communication is required.

As will be appreciated by one of ordinary skill in the relevant art, the present invention is applicable not only to a two-layer system but also to systems having any number of layers. Specifically, a chain of vertical communications would be utilized to accumulate (or distribute) opaque information from (or to) the multiple layers.

While the invention has been particularly shown and described with reference to preferred embodiments thereof, it will be understood by those skilled in the relevant art that various changes in form and details may be made therein without departing from the spirit and scope of the invention.

What is claimed is:

1. A method for communicating between a first communication end and a second communication end, the first and second communication ends including a plurality of vertical functional layers, each of the plurality of vertical functional layers on the first communication end communicating with a corresponding vertical functional layer on the second communication end, comprising the steps of:

(a) sending vertically, from a first layer on the first communication end to a second layer on the first communication end, a first opaque information intended for a first layer on the second communication end;

(b) sending vertically, from said second layer on the first communication end to a third layer on the first communication end said first opaque information and a second opaque information intended for a second layer on the second communication end;

(c) accumulating opaque information as in step (b) until a nth layer on the first communication end receives (n-1) pieces of opaque information from each of the (n-1) layers below said nth layer on the first communication end; and (d) sending horizontally, from said nth layer on the first communication end to a nth layer on the second communication end, a message that includes non-opaque information usable in a horizontal communication between said nth layers on the first and second communication ends and said (n-1) pieces of opaque information usable in an indirect communication between each of the (n-1) layers below said nth layer.

2. The method of claim 1, further comprising the steps of:

(e) receiving said message in said nth layer on the second communication end;

(f) said nth layer on the second communication end extracting said (n-1) pieces of opaque information from said message;

(g) sending vertically said (n-1) pieces of opaque information from said nth layer on the second communication end to a (n-1)th layer on the second communication end;

(h) said (n-1)th layer on the second communication end extracting opaque information sent by a (n-1)th layer on the first communication end from said (n-1) pieces of opaque information leaving (n-2) pieces of opaque information;

(i) sending vertically said (n-2) pieces of opaque information to a (n-2)th layer on the second communication end; and (j) extracting and sending pieces of opaque information in accordance with steps (h) and (i) until each layer on the second communication end receives a piece of opaque information sent from a corresponding layer on the first communication end.

3. The method of claim 2, further comprising the steps of:

(k) sending vertically, from a first layer on the second communication end to a second layer on the second communication end, a first modified opaque information intended for said first layer on the first communication end;

(l) sending vertically, from said second layer on the second communication end to a third layer on the second communication end said first modified opaque information and a second modified opaque information intended for said second layer on the first communication end;

(m) accumulating modified opaque information as in step (l) until said nth layer on the second communication end receives (n-1) pieces of modified opaque information from each of the (n-1) layers below said nth layer on the second communication end; and (n) sending horizontally, from said nth layer on the second communication end to said nth layer on the first communication end, a second message that includes modified non-opaque information necessary to complete said horizontal communication between said nth layers on the first and second communication ends and said (n-1) pieces of modified opaque information usable in an indirect communication between each of the (n-1) layers below said nth layer;

(o) receiving said second message in said nth layer on the first communication end;

(p) said nth layer on the first communication end extracting said (n-1) pieces of modified opaque information from said second message;

(q) sending vertically said (n-1) pieces of modified opaque information from said nth layer on the first communication end to said (n-1)th layer on the first communication end;

(r) said (n-1)th layer on the first communication end extracting modified opaque information sent by said (n-1)th layer on the second communication end from said (n-1) pieces of modified opaque information leaving (n-2) pieces of opaque information;

(s) sending vertically said (n-2) pieces of opaque information to said (n-2)th layer on the first communication end; and (t) extracting and sending pieces of modified opaque information in accordance with steps (r) and (s) until each layer on the first communication end receives a piece of modified opaque information sent from a corresponding layer on the second communication end thus completing said indirect communication between the (n-1) layers below said nth layer.

4. A method for communicating in a system comprising layers of functionality, comprising the steps of:

(a) sending vertically from a first layer on a first communication end to a second layer on said first communication end opaque information intended for a first layer on a second communication end; and (b) sending horizontally from said second layer on said first communication end to a second layer on said second communication end a first message that includes non-opaque information usable in a horizontal communication between said second layers on said first and second communication ends and said opaque information usable in an indirect communication between said first layers on said first and second communication ends.

5. A method for completing individual communications between multiple layers on a first and second communication end with a single horizontal communication, comprising the steps of:

(1) accumulating (n-1) pieces of opaque information at a nth layer on the first communication end, wherein opaque information has meaning to a single layer but not all layers;

(2) sending said (n-1) pieces of opaque information to said nth layer on the second communication end; and (3) distributing said (n-1) pieces of opaque information to the corresponding layers on the second communication end.

6. A computer program product for use with a computer system, said computer program product comprising:

a computer usable medium having computer readable program code means embodied in said medium for causing the computer system to complete individual communications between multiple layers on a first and second communication end with a single horizontal communication, said computer readable program code means comprising:

computer readable program code means for enabling the computer system to accumulate (n-1) pieces of opaque information at a nth layer on the first communication end, wherein opaque information has meaning to a single layer but not all layers;

computer readable program code means for enabling the computer system to send said (n-1) pieces of opaque information to said nth layer on the second communication end, wherein said (n-1) pieces of opaque information are distributed to the corresponding layers on the second communication end.

* * * * *